United States Patent
Ajisaka

(10) Patent No.: US 10,632,827 B2
(45) Date of Patent: Apr. 28, 2020

(54) VEHICLE LOWER PORTION STRUCTURE

(71) Applicant: TOYOTA JIDOSHA KABUSHIKI KAISHA, Toyota-shi (JP)

(72) Inventor: Satoshi Ajisaka, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 159 days.

(21) Appl. No.: 15/882,202

(22) Filed: Jan. 29, 2018

(65) Prior Publication Data
US 2018/0272852 A1    Sep. 27, 2018

(30) Foreign Application Priority Data
Mar. 23, 2017    (JP) ................. 2017-057970

(51) Int. Cl.
| | |
|---|---|
| *B60J 7/00* | (2006.01) |
| *B60K 1/04* | (2019.01) |
| *B62D 25/20* | (2006.01) |
| *B62D 21/15* | (2006.01) |
| *B62D 25/08* | (2006.01) |

(52) U.S. Cl.
CPC ............. *B60K 1/04* (2013.01); *B62D 21/152* (2013.01); *B62D 25/08* (2013.01); *B62D 25/2018* (2013.01); *B60K 2001/0411* (2013.01); *B60K 2001/0438* (2013.01); *B60Y 2306/01* (2013.01)

(58) Field of Classification Search
CPC . B60G 17/04; B60R 13/0206; B60R 13/0212; B60R 2013/0281; B60R 2013/0293; H01L 2924/00; H01L 2924/00014; H01L 2224/45144; H01L 2924/00015; H01L 2224/48463
See application file for complete search history.

(56) References Cited

U.S. PATENT DOCUMENTS

| | | | |
|---|---|---|---|
| 7,088,075 B2* | 8/2006 | Baba ............... | H01M 2/105 320/112 |
| 7,654,352 B2* | 2/2010 | Takasaki ........... | B60K 1/04 180/68.5 |

(Continued)

FOREIGN PATENT DOCUMENTS

| | | |
|---|---|---|
| DE | 10 2013 204 765 A1 | 9/2014 |
| DE | 10 2016 119 670 B4 | 6/2019 |

(Continued)

*Primary Examiner* — Kiran B Patel
(74) *Attorney, Agent, or Firm* — Oblon, McClelland, Maier & Neustadt, L.L.P.

(57) ABSTRACT

The present disclosure provides a vehicle lower portion structure including: a case main body portion, disposed at a vehicle lower side of a vehicle cabin floor and including a bottom wall and peripheral walls that extend toward a vehicle upper side from a peripheral edge portion of the bottom wall, and accommodating a battery at an interior thereof; a front portion extending portion formed integrally with the case main body portion at a vehicle front side of the case main body portion, at the peripheral wall that is at a vehicle front side of the case main body portion; and an impact absorbing portion, extending in a vehicle longitudinal direction and deforming due to input of collision load from a vehicle front side, a rear end portion of the impact absorbing portion being connected to a vehicle front side region of the front portion extending portion.

5 Claims, 3 Drawing Sheets

(56) References Cited

U.S. PATENT DOCUMENTS

| | | | | |
|---|---|---|---|---|
| 7,749,644 | B2* | 7/2010 | Nishino | B60K 1/04 |
| | | | | 429/100 |
| 7,824,797 | B2* | 11/2010 | Nishino | B60K 1/04 |
| | | | | 429/154 |
| 8,079,435 | B2* | 12/2011 | Takasaki | B60K 1/04 |
| | | | | 180/68.5 |
| 8,276,697 | B2* | 10/2012 | Takasaki | B60K 1/04 |
| | | | | 180/68.5 |
| 8,739,909 | B2* | 6/2014 | Hashimoto | H01M 2/1083 |
| | | | | 180/68.5 |
| 8,814,255 | B2* | 8/2014 | Yamaji | B62D 25/20 |
| | | | | 296/193.07 |
| 8,980,458 | B2* | 3/2015 | Honjo | B60K 1/04 |
| | | | | 429/100 |
| 9,033,084 | B2* | 5/2015 | Joye | B60K 1/04 |
| | | | | 180/68.5 |
| 9,045,030 | B2* | 6/2015 | Rawlinson | B60K 1/04 |
| 9,187,136 | B1* | 11/2015 | Leanza | B62D 25/20 |
| 9,444,082 | B2* | 9/2016 | Tsujimura | H01M 2/1077 |
| 9,461,284 | B2* | 10/2016 | Power | B60L 53/80 |
| 9,537,125 | B2* | 1/2017 | Park | H01M 2/1077 |
| 9,694,772 | B2* | 7/2017 | Ikeda | B60K 1/04 |
| 9,735,404 | B2* | 8/2017 | Ohgitani | H01M 2/1072 |
| 9,809,101 | B2* | 11/2017 | Ikeda | B62D 29/001 |
| 9,919,591 | B2* | 3/2018 | Mizoguchi | B60K 1/04 |
| 9,929,389 | B2* | 3/2018 | Klimek | H01M 2/1077 |
| 9,937,781 | B1* | 4/2018 | Bryer | B60K 1/04 |
| 9,944,160 | B2* | 4/2018 | Nakamura | B60K 1/04 |
| 10,017,037 | B2* | 7/2018 | Newman | B62D 25/20 |
| 10,029,551 | B2* | 7/2018 | Ito | B60K 1/04 |
| 10,084,218 | B2* | 9/2018 | Merriman | H01M 10/613 |
| 10,099,546 | B2* | 10/2018 | Hara | B60L 50/66 |
| 10,160,492 | B2* | 12/2018 | Fees | B60K 1/04 |
| 2016/0006008 | A1 | 1/2016 | Volz | |

FOREIGN PATENT DOCUMENTS

| | | |
|---|---|---|
| FR | 1011256 A | 6/1952 |
| JP | 9-286354 A | 11/1997 |
| JP | 2006-182295 A | 7/2006 |
| JP | 2012-91636 | 5/2012 |
| JP | 2012-201284 | 10/2012 |

* cited by examiner

VEHICLE LOWER PORTION STRUCTURE

CROSS-REFERENCE TO RELATED APPLICATION

This application claims priority under 35 USC 119 from Japanese Patent Application No. 2017-057970, filed on Mar. 23, 2017, the disclosure of which is incorporated by reference herein.

BACKGROUND

Technical Field

The present disclosure relates to a vehicle lower portion structure.

Related Art

In a battery-mounted vehicle such as an electric car or the like, plural batteries are mounted beneath the vehicle cabin floor in a state of being accommodated in a battery case. Therefore, a portion having a large load (mass) exists beneath the vehicle cabin. Accordingly, in a case in which the vehicle is involved in a front collision with an obstacle or the like, a large inertial force may be applied to the battery unit and to the vehicle cabin that is positioned thereabove, and the vehicle cabin may easily deform.

Thus, various proposals have been made in order to reduce the impact force that is applied to the vehicle cabin in such a battery-mounted vehicle. For example, Japanese Patent Application Laid-Open (JP-A) No. 2012-201284 discloses an impact absorbing floor structure in which a frame, which is substantially U-shaped in cross-section and that is long in the longitudinal direction, extends beneath the floor in an electric car up to a region that is further toward the front side than the front wheels of the vehicle. Further, a structure is proposed in which, due to the battery not being accommodated in a fixed range of this frame from the distal end (the front end), this portion is made to be an impact absorbing portion at the time of a front collision.

Further, JP-A No. 2012-91636 discloses, in an electric car in which the battery unit is mounted to the lower portion of the vehicle cabin floor, a battery mounting structure in which the front end portions of frame members, which extend in the vehicle longitudinal direction and structure supporting members that support the battery module of the battery unit, are joined to the suspension cross member. By forming such a structure, the impact absorbing performance may be improved by transmitting the inertial force, which is due to the battery unit at the time of a front collision, from the joined regions to the suspension member.

However, in the impact absorbing floor structure of JP-A No. 2012-201284, a frame that is continuous in a single straight line in the vehicle longitudinal direction is formed. Therefore, it can be thought that it is difficult to sufficiently ensure the impact absorbing performance of the frame, and there is the concern that the battery (the battery cells) itself may be damaged.

Further, in the battery mounting structure of JP-A No. 2012-91636, a structure that absorbs inertial force needs to be provided separately at the suspension member in order for the suspension member to receive the inertial force that is applied from the battery module at the time of a front collision.

SUMMARY

The present disclosure provides, in a vehicle in which a battery is accommodated beneath a floor, a vehicle lower portion structure that may improve the impact absorbing performance by a simple structure.

A first aspect of the present disclosure is a vehicle lower portion structure including: a case main body portion, disposed at a vehicle lower side of a vehicle cabin floor and including a bottom wall and peripheral walls that extend toward a vehicle upper side from a peripheral edge portion of the bottom wall, the case main body portion accommodating a battery at an interior thereof; a front portion extending portion formed integrally with the case main body portion at a vehicle front side of the case main body portion, at the peripheral wall that is at a vehicle front side of the case main body portion; and an impact absorbing portion extending in a vehicle longitudinal direction, a rear end portion of the impact absorbing portion being connected to a vehicle front side region of the front portion extending portion, and the impact absorbing portion deforming due to input of collision load from a vehicle front side.

In the vehicle lower portion structure according to the first aspect of the present disclosure, the case main body portion, which has the bottom wall and the peripheral wall, is disposed at the vehicle lower side of the vehicle cabin floor, and a battery is accommodated at the interior thereof. Further, the front portion extending portion is formed at the vehicle front side of the case main body portion, integrally with the case main body portion from the peripheral wall at the vehicle front side of the case main body portion. The vehicle lower portion structure has, at the vehicle front side of this front portion extending portion, the impact absorbing portion that extends in the vehicle longitudinal direction and whose rear end portion is connected to the vehicle front side of the front portion extending portion.

Accordingly, in a case in which the vehicle is involved in a front collision, the collision load is first inputted to the impact absorbing portion. Due thereto, the impact absorbing portion deforms, and collision energy is absorbed. In a case in which the collision energy cannot be completely absorbed by the deformation of the impact absorbing portion, the front portion extending portion deforms, and the collision energy that is due to the front collision is absorbed. Due thereto, deformation of the case main body portion, or damage to the battery accommodated at the interior of the case main body portion, may be prevented or suppressed.

Further, because the front portion extending portion is provided integrally with the case main body portion, the structure may be made simple (the assembly workability may become good).

In a second aspect of the present disclosure, in the above-described first aspect, the case main body portion may be connected to rockers, the rockers extending in the vehicle longitudinal direction at vehicle transverse direction both sides of the case main body portion.

In a second aspect of the present disclosure, the case main body portion is connected to the pair of rockers that extend in the vehicle longitudinal direction at the vehicle transverse direction both end portions of the case main body portion. Accordingly, the collision load that is applied, due to a front collision of the vehicle, to the case main body portion that accommodates the battery is dispersed to the rockers. Thus, deformation of the case main body portion, or damage to the battery accommodated at the interior of the case main body portion, may further be prevented or suppressed.

In a third aspect of the present disclosure, in the above-described aspects, a pair of left and right suspension lower arms may be mounted swingably to both vehicle transverse direction end portions of the front portion extending portion.

In the vehicle lower portion structure according to the third aspect of the present disclosure, a pair of left and right suspension lower arms are mounted to the vehicle transverse direction both end portions of the front portion extending portion. Accordingly, existing suspension members that support the front suspensions are rendered unnecessary, and the vehicle body structure may be simplified. Further, the front suspensions (the suspension lower arms) can be made integral with and made into a module with the front portion extending portion (the case main body portion).

At the time of a front collision of the vehicle, collision energy is absorbed due to the front portion extending portion deforming and the front suspensions that are mounted to the front portion extending portion also deforming. As a result, the absorbed amount of collision energy at the front side of the case main body portion may increase, and deformation of the case main body portion, or damage to the battery accommodated at the interior of the case main body portion, may further be prevented or suppressed.

In a fourth aspect of the present disclosure, in the above-described aspects, the impact absorbing portion may include a pair of left and right under members that extend in the vehicle longitudinal direction, and an under reinforcement that connects front ends of the under members.

In the vehicle lower portion structure according to the fourth aspect of the present disclosure, the impact absorbing portion that is disposed at the vehicle front side of the front portion extending portion includes a pair of left and right under members that extend in the vehicle longitudinal direction, and a lower reinforcement that connects the front ends of the under members. Accordingly, the collision energy at the time of a front collision may be absorbed due to the lower reinforcement and the under members deforming at the time of a front collision of the vehicle.

According to the above-described aspects, the vehicle lower portion structure of the present disclosure may improve the impact absorbing performance at the time of a front collision of a vehicle, with a simple structure.

BRIEF DESCRIPTION OF THE DRAWINGS

Exemplary embodiment will be described in detail based on the following figures, wherein.

DETAILED DESCRIPTION

A vehicle lower portion structure according to a first embodiment of the present disclosure is described with reference to FIG. 1 through FIG. 3. Note that the vehicle vertical direction upper side is indicated by arrow UP, the vehicle longitudinal direction front side is indicated by arrow FR, and the vehicle transverse direction right side is indicated by arrow RH. Further, in FIG. 2, illustration of side members 14 and rockers 12 is omitted.

A vehicle 12 to which a vehicle lower portion structure 10 is applied is described first.

Figure 1:
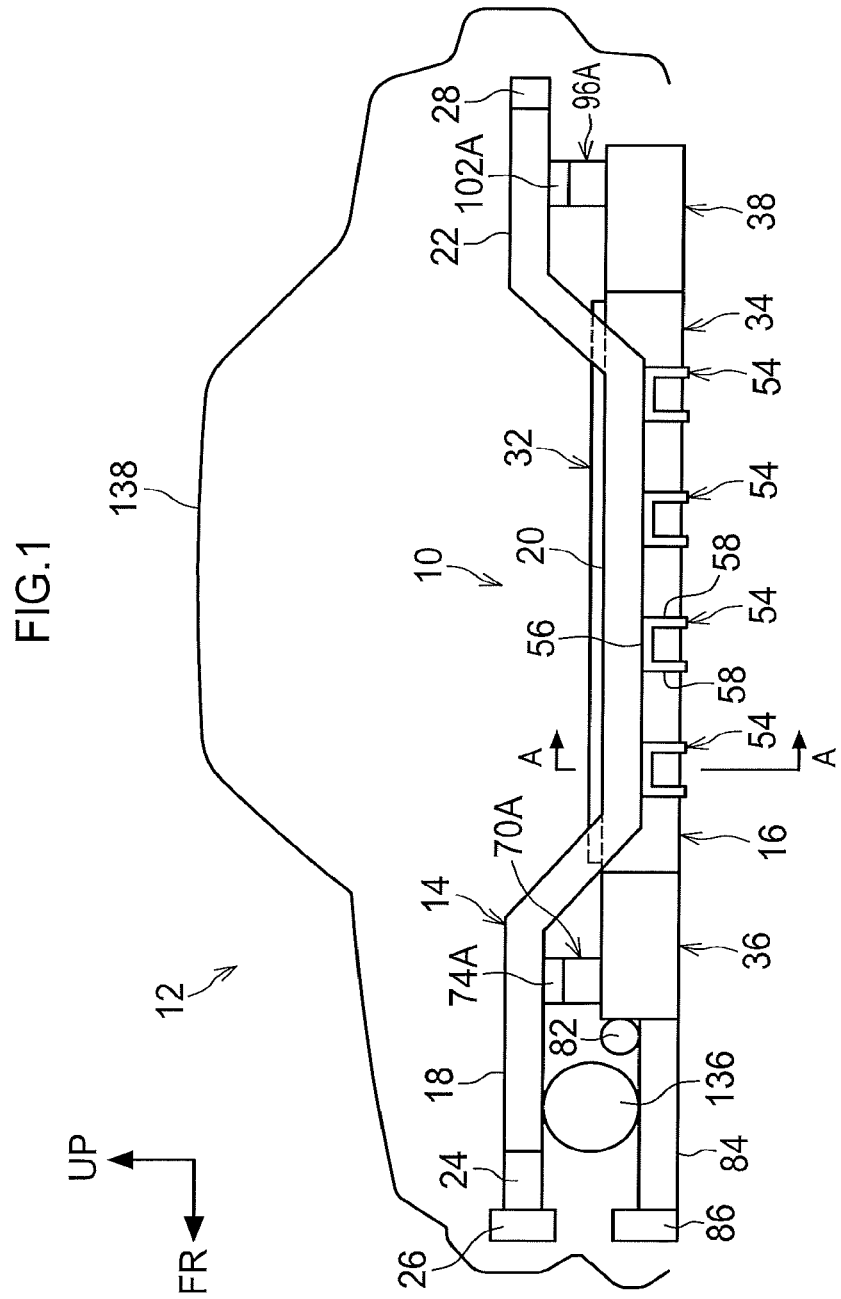
FIG. 1 is a schematic drawing showing a vehicle lower portion structure according to an embodiment of the present disclosure as seen from a vehicle side portion.
Figure 2:
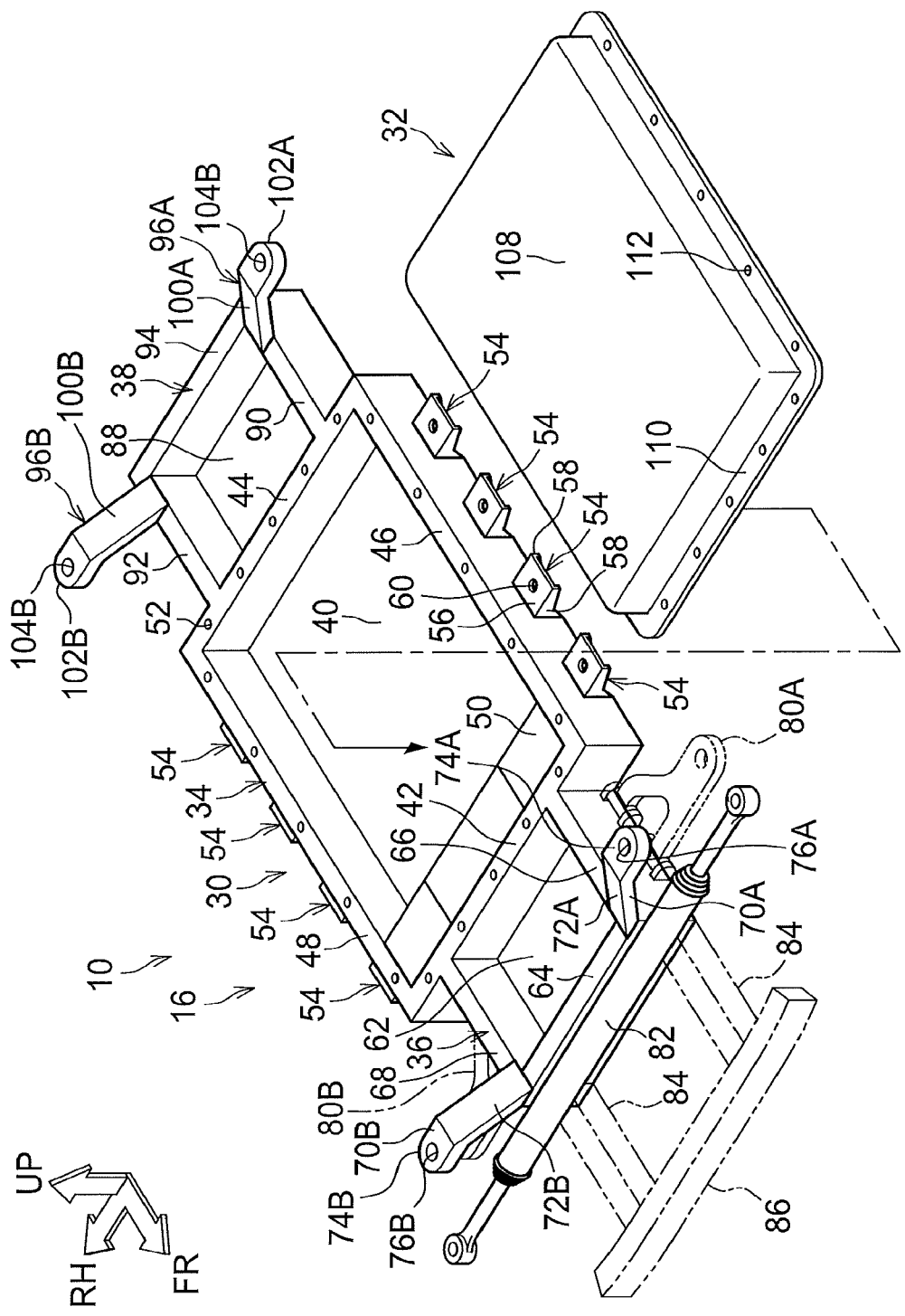
FIG. 2 is a perspective view showing the vehicle lower portion structure according to the embodiment of the present disclosure with a portion thereof omitted.

As shown in FIG. 1, the vehicle 12 is an electric car, and has the side members 14 that are vehicle frame members, and a battery pack 16 that is supported at the side members 14.

As shown in FIG. 1, the side members 14 (only one of which is illustrated) are a pair of left and right vehicle frame members that extend from the front end to the rear end of the vehicle at the vehicle transverse direction both side portions of the vehicle. Each of the side members 14 has a front side member 18, a floor under reinforcement 20, and a rear side member 22. The front side member 18 extends in the vehicle longitudinal direction at the vehicle front side. The floor under reinforcement 20 extends from the rear end of the front side member 18 in continuation with the vehicle rear side thereof at a position that is one step lower than the front side member 18, and supports a floor panel 120. The rear side member 22 extends from the rear end of the floor under reinforcement 20 in continuation with the vehicle rear side thereof at a position that is one step higher than the floor under reinforcement 20.

An upper reinforcement 26 is mounted to the front ends of the front side members 18 via crash boxes 24. The upper reinforcement 26 extends in the vehicle transverse direction, and connects the front ends of the pair of front side members 18 (the crash boxes 24).

The rear end of the rear side member 22 also is similarly connected to the other rear side member 22 by a reinforcement 28.

As shown in FIG. 2, the battery pack 16 has a case lower 30, and a case upper 32 that is a cover body of a battery module accommodating portion of the case lower 30.

The case lower 30 has a case main body portion 34, a front portion extending portion 36, and a rear portion extending portion 38. The case main body portion 34 is shaped as a box that is rectangular in plan view and whose upper portion is open. The front portion extending portion 36 is formed at the front side of the case main body portion 34 and is shaped as a box that is rectangular in plan view and whose upper portion is open. The rear portion extending portion 38 is formed at the rear side of the case main body portion 34 and is shaped as a box that is rectangular in plan view and whose upper portion is open. At the case lower 30, the case main body portion 34, the front portion extending portion 36, and the rear portion extending portion 38 are formed integrally as a casting.

The case main body portion 34 is formed to be rectangular in plan view by a floor wall 40 being surrounded by a front wall 42, a rear wall 44, a left wall 46 and a right wall 48. A battery module 50 is accommodated at the interior of this case main body portion 34.

Screw holes 52 for mounting of the case upper 32 are formed in the top surfaces of the front wall 42, the rear wall 44, the left wall 46 and the right wall 48 of the case main body portion 34. Note that, in FIG. 2, only one of the screw holes 52 is allocated with the reference numeral, and reference numerals are omitted at the others, in order to avoid complicating the drawing.

Moreover, plural mounting portions 54, which are for mounting the case main body portion 34 to the floor under reinforcements 20, are formed at the outer side surfaces of the left wall 46 and the right wall 48 at a predetermined interval in the vehicle longitudinal direction. As shown in FIG. 1 and FIG. 2, the mounting portion 54 has a top wall 56 that is rectangular as seen in plan view, and a pair of side walls 58 that respectively extend downward from the front end and the rear end of the top wall 56. As shown in FIG. 2 and FIG. 3, the side walls 58 are formed such that the vertical direction widths are wide at the left wall 46 sides and right wall 48 sides thereof, and the vertical direction widths become more narrow toward the vehicle transverse direction outer sides.

An insert-through hole 60 for the inserting-through of a fastener is formed in the top wall 56. Note that, in FIG. 1 and FIG. 2, only one of the insert-through holes 60 is allocated with the reference numeral, and reference numerals are omitted at the others, in order to avoid complicating the drawing.

The front portion extending portion 36 is formed integrally with the case main body portion 34 at the vehicle front side of the case main body portion 34 (the front wall 42). The front portion extending portion 36 is formed in a rectangular shape as seen in plan view due to a bottom wall 62 being surrounded by a front wall 64, a left wall 66, a right wall 68 and the front wall 42 of the case main body portion 34. Note that a battery module is not disposed at the interior of this front portion extending portion 36.

Further, as shown in FIG. 2, the vehicle transverse direction width of the front portion extending portion 36 is set to be narrow, as compared with the vehicle transverse direction width of the case main body portion 34, in order to mount lower arms 80A, 80B.

Moreover, brackets 70A, 70B for front side member 18 mounting are provided at the front end portions of the top surfaces of the left wall 66 and the right wall 68, respectively. The bracket 70A has a leg portion 72A that extends so as to be inclined upwardly toward a vehicle transverse direction outer side (upwardly and toward the left) from the top surface of the left wall 66, and a mounting portion 74A that is formed so as to extend toward the vehicle transverse direction outer side (the left side) from the upper end of the leg portion 72A. An insert-through hole 76A for a fastener, which is for fastening to the front side member 18, is formed in the mounting portion 74A. Accordingly, as shown in FIG. 1, the mounting portion 74A is made to abut the bottom surface of the front side member 18, and the bracket 70A is fastened to the front side member 18 by a fastener (not shown) that is inserted-through the insert-through hole 76A. Namely, the front portion extending portion 36 is fastened to the front side member 18.

The bracket 70B has left-right symmetry with respect to the bracket 70A. Therefore, structural elements of the bracket 70B that are similar to structural elements of the bracket 70A are donated by the same reference numerals as the structural elements of the bracket 70A except with a B replacing the A, and detailed description thereof is omitted.

The lower arm 80A is supported at the lower portion of the left wall 66 so as to be swingable in the vertical direction around a shaft body that extends in the vehicle longitudinal direction and is supported at the left wall 66. The lower arm 80B is similarly supported at the lower portion of the right wall 68. Namely, the front portion extending portion 36 is made integral with the front suspensions that include the lower arms 80A, 80B.

As shown in FIG. 1 and FIG. 2, a steering gear 82 that extends in the vehicle transverse direction is mounted to the upper portion of the front wall 64.

Rear ends of a pair of left and right under members 84 are connected to the lower portion of the front wall 64.

The respective under members 84 extend in the vehicle longitudinal direction at the vehicle front side of the front portion extending portion 36, and the front ends thereof are connected by a lower reinforcement 86 that extends in the vehicle transverse direction. Note that the under members 84 and the lower reinforcement 86 are structured so as to deform more easily than the front portion extending portion 36 at the time when collision load is inputted from the vehicle front.

As shown in FIG. 2, the rear portion extending portion 38 is molded integrally with the case main body portion 34 at the vehicle rear side of the case main body portion 34 (the rear wall 44). The rear portion extending portion 38 is formed in a rectangular shape as seen in plan view due to a bottom wall 88 being surrounded by a left wall 90, a right wall 92, a rear wall 94 and the rear wall 44 of the case main body portion 34. Note that a battery module is not disposed at the interior of this rear portion extending portion 38.

Further, as shown in FIG. 2, the vehicle transverse direction width of the rear portion extending portion 38 is formed to be narrow as compared with the vehicle transverse direction width of the case main body portion 34.

Moreover, brackets 96A, 96B for mounting the rear side members 22 are provided at the rear end portions of the top surfaces of the left wall 90 and the right wall 92, respectively. In the same way as the brackets 70A, 70B, the brackets 96A, 96B have leg portions 100A, 100B, and mounting portions 102A, 102B in which insert-through holes 104A, 104B are formed. Further, the brackets 96A, 96B are fastened to the rear side members 22 by fasteners that are inserted-through the insert-through holes 104A, 104B. Namely, the rear portion extending portion 38 is fastened to the rear side members 22.

Further, structural parts of unillustrated rear suspensions are mounted to the left wall 90 and the right wall 92, and the rear suspensions and the rear portion extending portion 38 are made integral.

The case upper 32 is placed on the case main body portion 34 of the case lower 30. The case upper 32 has a cover main body portion 108 that is formed in the shape of a box that is rectangular in plan view and whose lower side is open, and a flange portion 110 that extends toward the outer side from the opening portion of the cover main body portion 108. Plural insert-through holes 112 for fasteners are formed in the flange portion 110 at positions that face the screw holes 52 when the flange portion 110 is placed on the upper portion of the case main body portion 34. Accordingly, the case upper 32 is fixed to the case main body portion 34 due to the flange portion 110 of the case upper 32 being placed on the upper portion of the case main body portion 34, and fasteners being inserted-through the insert-through holes 112 of the flange portion 110 and screwed-together with the screw holes 52 of the case main body portion 34.

Figure 3:
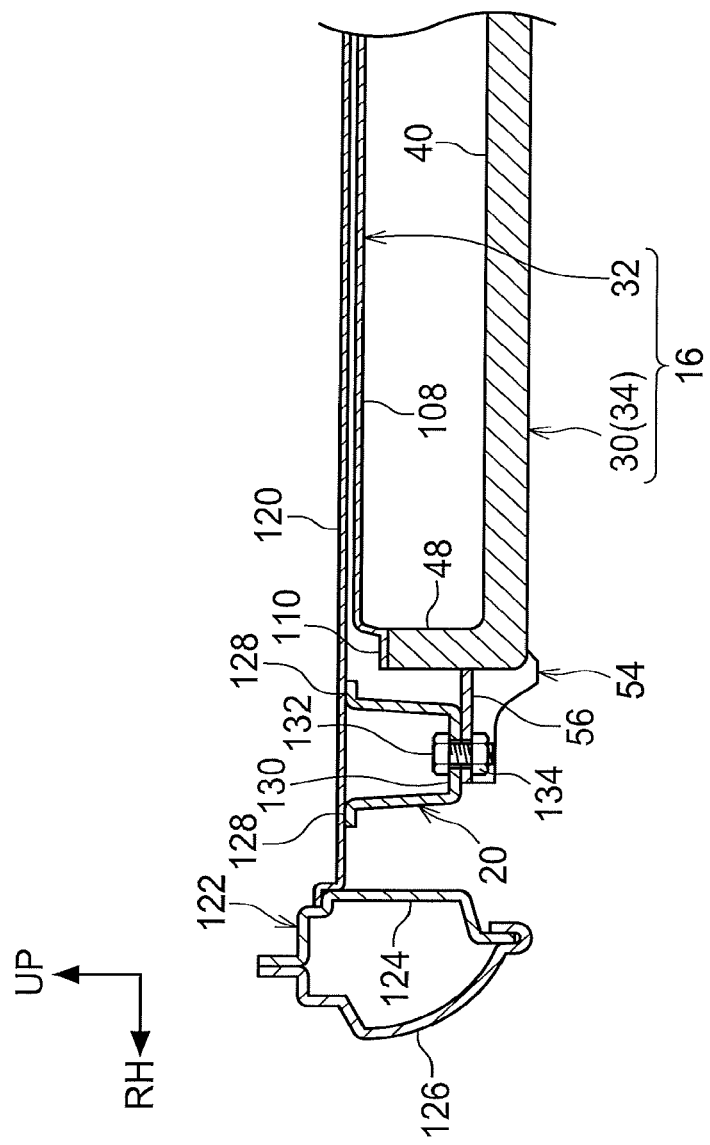
FIG. 3 is a cross-sectional view along line A-A of FIG. 1.

Note that, as shown in FIG. 3, the battery pack 16 is disposed beneath the floor panel 120. The floor panel 120 is joined to the rockers 122 that extend in the vehicle longitudinal direction at the vehicle transverse direction both end portions of the vehicle cabin. Note that a closed cross-section is structured at the rocker 122 due to the flange portions of a rocker inner 124, which is disposed at the vehicle transverse direction inner side, and a rocker outer 126, which is disposed at the vehicle transverse direction outer side, being joined together. Further, the floor panel 120 is supported from below by the floor under reinforcements 20 that are hat-shaped in cross-section. In cross-section, the floor under reinforcement 20 is shaped as a hat whose upper side is open, and a closed cross-section is structured by flange portions 128 at both end portions of the floor under reinforcement 20 being joined to the floor panel 120. Further, insert-through holes for fasteners (bolts 132) are formed in bottom walls 130 of the floor under reinforcements 20. At the time of assembly, the battery pack 16 (the case main body portion 34) is fastened to the floor under reinforcements 20 due to the bolts 132 being inserted-through the insert-through holes 60 of the mounting portions 54 of the case main body portion 34 from the insert-through hole sides of the bottom walls 130 of the floor under reinforcements 20, and being fastened by nuts 134 from the lower side. Namely, the battery pack 16 (the case main body portion 34) is connected to the rockers 122 via the floor under reinforcements 20 and the floor panel 120.

Note that, in FIG. 1, reference numeral 136 denotes a motor, and reference numeral 138 denotes an upper monocoque body.

Operation of the vehicle lower portion structure 10 that is structured as described above is described.

In a case in which the vehicle 12 is involved in a front collision with an obstacle or the like, first, collision load is inputted to the lower reinforcement 86 and the under members 84 from the vehicle front, and the lower reinforcement 86 and the under members 84 deform. Due thereto, the collision energy that is due to the front collision is absorbed. In a case in which the collision energy is not completely absorbed by the deformation of the lower reinforcement 86 and the under members 84, the collision energy is absorbed due to the front portion extending portion 36, to which the rear ends of the under members 84 are connected, and structural parts of the front suspensions, which are mounted to the front portion extending portion 36, deforming.

In this way, at the time of a front collision of the vehicle, due to the lower reinforcement 86, the under members 84, the front portion extending portion 36, and structural parts of the front suspensions that are mounted to the front portion extending portion 36 deforming, collision energy is absorbed sufficiently, and deformation of the case main body portion 34, and damage to the battery module 50 accommodated in the case main body portion 34, may be prevented or suppressed.

Further, in the case of a slight front collision, deformation arises at only the under members 84 and the lower reinforcement 86. Because the under members 84, the lower reinforcement 86, and the battery pack 16 (the case lower 30) are made to be separate bodies, after the collision, it suffices to replacing only the under members 84 and the lower reinforcement 86.

Moreover, the battery pack 16 (the case main body portion 34 of the case lower 30) is connected to the rockers 122 via the floor under reinforcements 20 and the floor panel 120. Therefore, the collision load that is inputted to the battery pack 16 (the case main body portion 34) is dispersed to the rockers 122. Accordingly, at the time of a front collision of the vehicle, deformation of the case main body portion 34, and damage to the battery module 50 that is accommodated in the case main body portion 34, may be further prevented or suppressed.

Further, as shown in FIG. 3, at the battery pack 16, the case main body portion 34 is disposed between the pair of floor under reinforcements 20, and the width in the vehicle transverse direction is ensured to be wide. Therefore, the battery module 50 of a predetermined capacity may be accommodated within the case main body portion 34.

On the other hand, the vehicle transverse direction width of the front portion extending portion 36 is formed to be more narrow than that of the case main body portion 34. Therefore, the lower arms 80A, 80B can be mounted to the left wall 66 and the right wall 68. Because the rear portion extending portion 38 also is formed similarly to the front portion extending portion 36, structural parts of the rear suspensions can be mounted to the left wall 90 and the right wall 92.

Because the front portion extending portion 36 supports the front suspensions (the lower arms 80A, 80B) in this way, existing suspension members may be omitted. Namely, the front portion extending portion 36, which is provided at the battery pack 16 in order to absorb the collision energy at the time of a front collision, supports the front suspensions (also functions as suspension members). Accordingly, the structure of the vehicle body may be simplified. The same holds for the rear portion extending portion 38 as well.

Further, the front suspensions and the rear suspensions can be made integral with and made into a module with the battery pack 16 by the front portion extending portion 36 and the rear portion extending portion 38. Accordingly, the vehicle is structured by the upper monocoque body 138 being mounted on the upper portion of a structure in which the battery pack 16 and the front suspensions and rear suspensions have been made integral (have been made into a module). Therefore, vehicles of different vehicle types may be manufactured merely by replacing the upper monocoque body 138 with an upper monocoque body of a different design.

As compared with the case main body portion 34, the battery module 50 and the like are not accommodated at the interior of the front portion extending portion 36. Thus, at the time of a front collision, it may be easy for the front portion extending portion 36 to deform as compared with the case main body portion 34 at whose interior the battery module 50 is accommodated.

Moreover, although the front portion extending portion 36 and the case main body portion 34 are formed integrally, they are partitioned by the front wall 42, and therefore, deformation of the front portion extending portion 36 reaching the case main body portion 34 may be prevented or suppressed. Accordingly, deformation of the case main body portion 34 due to a front collision, and damage to the battery module 50 that is accommodated in the case main body portion 34, may be prevented or suppressed more.

Note that, in the present embodiment, the front portion extending portion 36 is formed in the shape of a box that is rectangular as seen in plan view and whose upper portion is open. However, the present invention is not limited thereto. The shape may be any shape, unless the front portion extending portion has a structure that, at the time of a front collision, deforms more easily than the case main body portion 34 and is more difficult to deform than the lower reinforcement 86 and the under members 84.

Further, although the lower reinforcement 86 and the under members 84 are provided as impact absorbing portions in the present embodiment, the present disclosure is not limited thereto. The impact absorbing portion may have any configuration unless it is disposed at the vehicle front side of the front portion extending portion 36, and it deforms more easily than the front portion extending portion 36 at the time of a front collision.

Moreover, in the present embodiment, the vehicle lower portion structure 10 is applied to the vehicle 12 that is an electric car, but the present disclosure is not limited to this. The vehicle lower portion structure 10 may also be applied to a vehicle such as a hybrid vehicle (an HV) or the like, provided that the vehicle is a vehicle in which the battery pack 16 is mounted beneath the floor panel 120.

What is claimed is:
1. A vehicle lower portion structure comprising:
 a case main body portion, disposed at a vehicle lower side of a vehicle cabin floor and including a bottom wall and peripheral walls that extend toward a vehicle upper side from a peripheral edge portion of the bottom wall, the case main body portion accommodating a battery at an interior thereof;

a front portion extending portion formed integrally with the case main body portion at a vehicle front side of the case main body portion, at the peripheral wall that is at a vehicle front side of the case main body portion; and an impact absorbing portion extending in a vehicle longitudinal direction, a rear end portion of the impact absorbing portion being connected to a vehicle front side region of the front portion extending portion, and the impact absorbing portion being structured so as to deform more easily than the front portion extending portion.

2. The vehicle lower portion structure of claim 1, wherein the case main body portion is connected to rockers, the rockers extending in the vehicle longitudinal direction at vehicle transverse direction both sides of the case main body portion.

3. The vehicle lower portion structure of claim 1, wherein a pair of left and right suspension lower arms are mounted swingably to both vehicle transverse direction end portions of the front portion extending portion.

4. The vehicle lower portion structure of claim 1, wherein the impact absorbing portion includes a pair of left and right under members that extend in the vehicle longitudinal direction, and an under reinforcement that connects front ends of the under members.

5. The vehicle lower portion structure of claim 1, wherein the front portion extending portion is structured as a left and right pair and extends in the vehicle longitudinal direction.

* * * * *